United States Patent
Shamshoum et al.

(10) Patent No.: US 6,384,160 B1
(45) Date of Patent: May 7, 2002

(54) POLYOLEFIN CATALYST FOR POLYMERIZATION OF PROPYLENE AND A METHOD OF MAKING AND USING THEREOF

(75) Inventors: Edwar Shoukri Shamshoum, Houston; Christopher Garland Bauch, Seabrook; David John Rauscher, Angleton, all of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/116,075

(22) Filed: Jul. 15, 1998

Related U.S. Application Data

(62) Division of application No. 08/770,882, filed on Dec. 20, 1996, now Pat. No. 5,849,655.

(51) Int. Cl.$^7$ ................................................. C08F 4/44
(52) U.S. Cl. ............................... 526/124.9; 526/125.3; 526/128
(58) Field of Search ........................... 526/124.9, 125.3, 526/128

(56) References Cited

U.S. PATENT DOCUMENTS

| | | | | |
|---|---|---|---|---|
| 4,174,299 A | * | 11/1979 | Giannini et al. | 526/139 |
| 4,472,521 A | * | 9/1984 | Band | 526/125 |
| 4,673,661 A | * | 6/1987 | Lofgren et al. | 526/125 |
| 4,724,255 A | * | 2/1988 | Lofgren et al. | 526/125 |
| 4,767,735 A | * | 8/1988 | Ewen et al. | 526/159 |
| 4,816,433 A | * | 3/1989 | Terano et al. | 526/124 |
| 4,829,037 A | * | 5/1989 | Terano et al. | 502/112 |
| 4,829,038 A | * | 5/1989 | Hoppin et al. | 502/125 |
| 4,855,271 A | * | 8/1989 | McDaniel et al. | 526/125 |
| 4,927,797 A | * | 5/1990 | Ewen | 526/124 |
| 4,937,300 A | * | 6/1990 | McDaniel | 526/125 |
| 4,990,477 A | * | 2/1991 | Kioka et al. | 526/125 |
| 4,990,479 A | * | 2/1991 | Ishimaru et al. | 526/125 |
| 5,064,799 A | * | 11/1991 | Monte et al. | 526/124 |
| 5,066,738 A | * | 11/1991 | Ewen | 526/124 |
| 5,075,270 A | * | 12/1991 | Brun et al. | 526/125 |
| 5,122,583 A | * | 6/1992 | Ewen et al. | 526/125 |
| 5,153,158 A | * | 10/1992 | Kioka et al. | 502/126 |
| 5,244,854 A | * | 9/1993 | Noristi et al. | 526/125 |
| 5,244,855 A | * | 9/1993 | Morini et al. | 526/125 |
| 5,244,989 A | * | 9/1993 | Hara et al. | 526/119 |
| 5,247,032 A | * | 9/1993 | Kioka et al. | 526/128 |
| 5,308,818 A | * | 5/1994 | Shamshoum et al. | 526/124 |
| 5,360,776 A | * | 11/1994 | Iiskola et al. | 526/125 |
| 5,488,022 A | * | 1/1996 | Takahashi et al. | 502/115 |
| 5,489,634 A | * | 2/1996 | Hara et al. | 526/119 |
| 5,498,770 A | * | 3/1996 | Hosaka et al. | 526/125.3 |
| 5,518,973 A | * | 5/1996 | Miro et al. | 526/126 |
| 5,547,912 A | * | 8/1996 | Kataoka et al. | 526/123.1 |
| 5,556,822 A | * | 9/1996 | Jung et al. | 502/125 |
| 5,567,665 A | * | 10/1996 | Wagner et al. | 526/124.5 |
| 5,594,079 A | * | 1/1997 | Hara et al. | 526/119 |
| 5,604,172 A | * | 2/1997 | Wagner et al. | 526/124.5 |
| 5,608,018 A | * | 3/1997 | Ebara et al. | 526/119 |
| 5,652,303 A | * | 7/1997 | Ishimaru et al. | 526/125.3 |
| 5,747,595 A | * | 5/1998 | Saito et al. | 526/125.3 |
| 5,849,655 A | * | 12/1998 | Shamshoum et al. | 502/125 |
| 5,891,817 A | * | 4/1999 | Shamshoum et al. | 526/124.9 |
| 6,133,385 A | * | 10/2000 | Shamshoum et al. | 526/128 |

FOREIGN PATENT DOCUMENTS

| | | | | |
|---|---|---|---|---|
| EP | 0 385 765 | * | 9/1990 | 526/125.3 |
| EP | 0 488 537 | * | 6/1992 | 526/125.3 |
| JP | 62-50309 | * | 3/1987 | 526/125.3 |
| JP | 63-39902 | * | 2/1988 | 526/125.3 |
| JP | 63-314213 | * | 12/1988 | 526/125.3 |
| JP | 64-54005 | * | 3/1989 | 526/124.9 |
| JP | 2-138308 | * | 5/1990 | 526/128 |
| JP | 2-138310 | * | 5/1990 | 526/128 |
| JP | 2-138351 | * | 5/1990 | 526/128 |
| JP | 2-242804 | * | 9/1990 | 526/124.9 |
| JP | 2-255808 | * | 10/1990 | 526/125.3 |
| JP | 3-43406 | * | 2/1991 | 526/128 |
| JP | 3-177402 | * | 8/1991 | 526/128 |

OTHER PUBLICATIONS

Alfa Aesar catalog Periodic Table of the Elements, 1990.*

* cited by examiner

*Primary Examiner*—Mark L. Bell
*Assistant Examiner*—J. Pasterczyk
(74) *Attorney, Agent, or Firm*—William D. Jackson

(57) ABSTRACT

A method of polymerizing olefins with a catalyst component which comprises
1) the reaction product of a magnesium alkoxide of the formula $M(OR)_2$, wherein M is magnesium, O is oxygen, R is a hydrocarbyl having from 1 to 20 carbons atoms, and a halogenating agent;
2) an electron donor wherein the electron donor is diethyl phthalate or di-isobutyl phthalate;
3) a titanating agent.

The catalyst component is activated with an organoaluminum cocatalyst. An external donor, specifically dicyclopentyl dimethoxysilane or cyclohexylmethyldimethoxy silane, can be added as a stereoselectivity control agent. The activated catalyst is used in the polymerization of olefins, particularly propylene, to obtain a polymer product with a broad molecular weight distribution.

26 Claims, No Drawings

POLYOLEFIN CATALYST FOR POLYMERIZATION OF PROPYLENE AND A METHOD OF MAKING AND USING THEREOF

This is a Divisional application of application Ser. No. 08/770,882, filed on Dec. 20, 1996, now U.S. Pat. No. 5,849,655.

BACKGROUND OF THE INVENTION

1. Field of the Invention

The present invention relates to a catalyst, a method of making said catalyst and a process for polymerizing α-olefins with said catalyst. The catalyst precursor is synthesized using metal alkoxides or metal dialkyls, a halogenating agent, an electron donor compound and a titanating agent. The catalyst precursor is activated with an aluminum alkyl and is used, optionally with a stereoselectivity control agent, to polymerize α-olefins, particularly propylene.

2. Description of the Related Art

Ziegler-Natta catalysts, their general methods of making, and subsequent use for polymerization of olefins, are well known in the art. However, while much is known about Ziegler-Natta catalysts, improvements in catalyst performance and in their ability to produce polyolefins having certain properties are desirable.

U.S. Pat. No. 4,472,521, issued Sep. 18, 1984 to Band, discloses a polyolefin catalyst made by contacting a $Mg(OR)_2$ and/or $Mn(OR)_2$ with titanium tetrachloride, then with a titanium tetrachloride halogenating agent, and then with an electron donor.

U.S. Pat. No. 4,673,661, issued Jun. 16, 1987, and U.S. Pat. No. 4,724,255, issued Feb. 9, 1988, both to Lofgren et al. disclose a polyolefin catalyst component made by chlorinating a magnesium alkyl which is then contacted with titanium tetrachloride, a Lewis base, and then at least once with titanium tetrachloride in the absence of a Lewis base. Lofgren et al. teach the criticality of an electron donor at the first titanium tetrachloride treatment step and further teach that away from the presence of an electron donor at subsequent titanation steps.

U.S. Pat. No. 4,855,271, issued Aug. 8, 1989, and U.S. Pat. No. 4,937,300, both to McDaniel et al. disclose a polyolefin catalyst derived from alumina impregnated with magnesium alkoxide, which is subsequently contacted with a lower order alcohol, chlorinated with silicon tetrachloride, and subsequently etched with a titanium tetrachloride.

U.S. Pat. No. 5,075,270, issued Dec. 24, 1991 to Brun et al. discloses a polyolefin catalyst made by reacting a magnesium alkoxide with an aluminosiloxane derivative, which product is then chlorinated with silicone tetrachloride, followed by transition metal treatment with titanium tetrachloride, with an electron donor optionally associated with the transition metal.

Even with these prior art methods there is another need for polyolefin catalysts having improved performance. These and other needs in the art will become apparent to those of skill in the art upon review of this patent specification.

SUMMARY OF THE INVENTION

It is one object of the present invention to provide for improved polyolefin catalysts, methods of their making, and methods of polymerizing olefins, particularly propylene.

It is another object of the present invention to provide for polyolefin catalysts having improved performance.

These and other objects of the present invention will become apparent to those of skill in the art upon review of this patent specification.

According to one embodiment of the present invention there is provided a process for preparing a polyolefin catalyst precursor. The method first includes contacting a metal alkoxide, such as magnesium ethoxide, or a metal dialkyl with a halogenating agent, such as titanium tetrachloride, to form (A) an alkoxy metal halide (or an alkyl metal halide), metal dihalide and complexes thereof. These compounds and complexes are formed in a slurry with a hydrocarbon solvent. An electron donor, such as an alkyl phthalate compound, was added and the mixture was heated. The slurry was cooled and the solid separated and washed. The solid was again treated with titanium tetrachloride in a slurry and heated. The solid was separated, washed and dried.

DETAILED DESCRIPTION OF THE INVENTION

The method of the present invention for making a catalyst component generally includes the steps of halogenating a metal alkoxide, metal dialkyl or metal alkoxyhalide, introducing an electron donor which is then followed by at least one subsequent titanation treatment.

Metal alkoxides, metal dialkyls or metal alkoxyhalides suitable for use in the present invention include any that which when utilized in the present invention will yield a suitable polyolefin catalyst. Preferred metal alkoxides, metal dialkyls and metal alkoxyhalides include those with metal from Group IIA and VIIB. Metal alkoxide, metal dialkyls and metal alkoxyhalides are preferred in that order. Most preferred is a magnesium alkoxide.

The general formula of the metal alkoxide, metal dialkyl or metal alkoxyhalide is $M(OR)_2$, $MR_2$ $M(OR)X$, wherein M is any suitable metal, and R is a hydrocarbyl or substituted hydrocarbyl moiety having from 1 to 20 carbon atoms and X is a halogen. M is preferably a Group IIA and VIIB metal, most preferably magnesium; R is preferably a hydrocarbyl or substituted hydrocarbyl moiety having from 2 to 10 carbon atoms, and more preferably R is a hydrocarbyl or substituted hydrocarbyl moiety having from 2 to 6 carbon atoms, and most preferably, R has from 2 to 4 carbon atoms. X is preferably chlorine.

Examples of preferred species of metal alkoxides include magnesium ethoxide, magnesium butoxide, manganese ethoxide, and manganese butoxide. The most preferred metal alkoxide species is magnesium ethoxide. While not required, it is preferred that the magnesium alkyls be soluble in a hydrocarbon solvent. Examples of suitable magnesium dialkyls include dibutyl magnesium and butylethyl magnesium.

Halogenating agents are those compounds which can cause replacement of the alkoxide group(s) or the alkyl groups with a halogen. Halogenating agents useful in the halogenating step for halogenating the metal alkoxide, metal dialkyl or metal alkoxyhalide include any halogenating agent which when utilized in the present invention will yield a suitable polyolefin catalyst. Chlorides are the preferred halogenating agents.

Group III, Group IV and Group V halides may be employed, as may hydrogen halides, or the halogens themselves. Specific examples of preferred halogenating agents are $BCl_3$, $AlCl_3$, $CCl_4$, $SiCl_4$, $TiCl_4$, $ZrCl_4$, $VOCl_4$, $VO_2Cl$, $CrO_2Cl$, $SbCl_5$, $POCl_2$, $PCl_5$, and $HfCl_4$. More preferred halogenating agents are $SiCl_4$ and $TiCl_4$, with the most preferred halogenating agent being $TiCl_4$. Other halogenating agents include alkyl halo silanes of the formula $R_xSiX_{(4-x)}$, wherein X is a halogen, R is a substituted or unsubstituted hydrocarbyl having 1 to 20 carbon atoms, and X is a halogen.

This initial halogenating of the metal alkoxide or metal dialkyl compound is generally conducted in a hydrocarbon solvent under an inert atmosphere. Non-limiting examples of suitable solvents include toluene, heptane, hexane, octane and the like. The preferred solvents are toluene and heptane.

In this halogenating step, the mole ratio of metal alkoxide or metal dialkyl to halogenating agent is generally in the range of about 6:1 to about 1:3, preferably in the range of about 3:1 to about 1:2, and more preferably in the range of about 2:1 to about 1:2.

This initial halogenating step is generally carried out at a temperature in the range of about 0° C. to about 100° C., a pressure in the range of about 15 psi to about 50 psi, and for a reaction time in the range of about 0.5 to about 4 hours. Preferably, the halogenating step is carried out at a temperature in the range of about 20° C. to about 90° C., a pressure in the range of about 15 psi to about 30 psi, and for a reaction time in the range of about 1 hour to about 2 hours.

Once the halogenating step is carried out and the metal alkoxide, metal dialkyl or metal alkoxyhalide is halogenated, the precipitated solid halide product is recovered by any suitable method, and washed with a hydrocarbon solvent to remove any reactants from the halogenating step.

An internal electron donor is then added to the metal halide. Internal electron donors for use in the preparation of polyolefin catalysts are well known, and any suitable internal electron donor may be utilized in the present invention which will provide a suitable catalyst. Electron donors are Lewis bases and may be an organic compounds of oxygen, nitrogen, phosphorous, or sulfur which can donate an electron pair to the catalyst.

The electron donor may be a monofunctional or polyfunctional compound, advantageously selected from among the aliphatic or aromatic carboxylic acids and their alkyl esters, the aliphatic or cyclic ethers, ketones, vinyl esters, acryl derivatives, particularly alkyl acrylates or methacrylates and silanes. Preferably, the electron donor of the present invention is an alkyl phthalate, and, more preferably, is a dialkyl phthalate. Specific examples of a suitable electron donor are diethyl phthalate (DEP) and di-isobutyl phthalate (DIBP). The amount of electron donor utilized will generally vary over the range of about 0.1 to about 1.0 mmol phthalate/g $Mg(OEt)_2$, preferably from about 0.1 to 0.2 mmol phthalate/g $Mg(OEt)_2$.

The contact time for addition of the electron donor ranges from about 0.5 hours to about 4 hours, preferably from about 1 hour to about 2 hours. Suitable temperatures for the addition of the electron donor step are generally in the range of about 20° C. to about 90° C., with suitable pressures in the range of about 15 psi to about 50 psi.

The titanation step is generally carried out by first slurrying the intermediate product. Nonlimiting examples of suitable hydrocarbons solvent include heptane, hexane, toluene, octane and the like.

The titanating agent is preferably a tetra-substituted titanium compound with all four substituents being the same and the substituents being a halide or an alkoxide or phenoxide with 2 to 10 carbon atoms. The same compound used as a halogenating agent may be used as a titanating agent. The most preferred titanating agent is $TiCl_4$.

In general, the amount of titanium tetrachloride utilized will generally be in the range of about 0.5 to about 5 equivalents, preferably in the range of about 1 to about 4, and most preferably in the range about 1.5 to about 2.5 equivalents (based on the magnesium compound).

Following the addition of the titanium tetrachloride, the slurry is then further heated to a temperature in the range of about 90° C. to about 150° C., preferably to a temperature in the range of about 100° C. to about 125° C. The slurry is held in this elevated temperature for a holding period in the range of about 0.5 hours to about 8 hours, preferably for a holding period in the range of about 1 hour to about 4 hours. Subsequently, the solid precipitate is recovered by any suitable recovery technique and washed with a hydrocarbon solvent.

The method of using the catalyst component in the polymerization of olefins generally include combining the catalyst component with a cocatalyst to form an active catalyst, adding an external electron donor for stereoselectivity control, optionally prepolymerizing the catalyst with a small amount of monomer, introducing the catalyst into a polymerization reaction zone containing the monomer.

The cocatalyst component used to activate the catalyst component is an organoaluminum cocatalyst component to form a catalyst system suitable for the polymerization of olefins. Typically, the cocatalysts which are used together with the transition metal containing catalyst component are organometallic compounds of Group Ia, IIa, and IIIa metals, such as aluminum alkyls. The aluminum alkyl cocatalyst is of the general formula $AlR'_3$ where R' is an alkyl of from 1–8 carbon atoms or a halogen and R' may be the same or different with at least one $R^1$ being an alkyl. Examples of aluminum alkyls are trimethyl aluminum (TMA), triethyl aluminum (TEAl), triisobutyl aluminum (TiBAl) and diethyl aluminum chloride (DEAC). The preferred aluminum alkyl is TEAl.

External donors which may be utilized in the preparation of a catalyst according to the present invention include organosilane compounds such as alkoxysilanes of general formula $SiR_m(OR')_{4-m}$ where R is selected from the group consisting of an alkyl group, a cycloalkyl group, an aryl group and a vinyl group; R' is an alkyl group; and m is 0–3, wherein R may be identical with R'; when m is 0, 1 or 2, the R' groups may be identical or different; and when m is 2 or 3, the R groups may be identical or different Preferably, the external donor of the present invention is selected from a silane compound of the following formula:

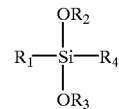

wherein $R_1$ and $R_4$ are both an alkyl or cycloalkyl group containing a primary, secondary or tertiary carbon atom attached to the silicon, $R_1$ and $R_4$ being the same or different; $R_2$ and $R_3$ are alkyl or aryl groups. In a preferred embodiment, $R_1$ is a alkyl or cycloalkyl of 1–6 carbon atoms, preferably methyl, isopropyl, cyclopentyl, cyclohexyl or t-butyl; $R_2$ and $R_3$ are methyl, ethyl, propyl, or butyl groups and not necessarily the same; and $R_4$ is also a alkyl or cycloalkyl of 1–6 carbon atoms, preferably methyl, isopropyl, cyclopentyl, cyclohexyl or t-butyl. Specific external donors are cyclohexylmethyldimethoxy silane (CMDS), diisopropyldimethoxysilane (DIDS) cyclohexylisopropyl dimethoxysilane (CIDS), dicyclopentyldimethoxysilane (CPDS) or di-t-butyl dimethoxysilane (DTDS), the most preferred being CPDS.

Generally, a prepolymerization process is effected by contacting a small amount of monomer with the catalyst after the catalyst has been contacted with the electron donor. A pre-polymerization process is described in U.S. Pat. Nos. 4,767,735, 4,927,797 and 5,122,583, hereby incorporated by reference.

The catalysts of the present invention can be used for the polymerization of any type of α-olefins. For example, the present catalyst is useful for catalyzing ethylene, propylene, butylene, pentene, hexene, 4-methylpentene and other α-alkenes having at least 2 carbon atoms, and also for mixtures thereof. Preferably, the catalysts of the present invention are utilized for the polymerization of propylene to produce polypropylene.

EXAMPLES

In the following Examples, catalysts have been synthesized from magnesium ethoxide that had been chlorinated with titanium tetrachloride. The resulting compound was treated with titanium tetrachloride to produce a catalyst.

Treatment of magnesium ethoxide with titanium tetrachloride gives a catalyst which allows the production of broad molecular weight polypropylene.

All reactions were carried under a nitrogen atmosphere using standard Schlenk and cannula techniques. Ti analysis was performed by spectrophographic determination of peroxide complex. The Mg analysis was performed by EDTA titration and Cl analysis by $AgNO_3$ titration.

$Mg(OEt)_2$ (20 g, 0.176 mol) was slurried in 160 mL toluene and heated to 90° C. To the stirred slurry, was added 40 mL (69.2 g, 0.364 mol) $TiCl_4$. The internal donor was added and the reaction mixture was heated to 115° C. for 2 h. The slurry was allowed to settle and cool to 90° C. Whereupon, the supernatant liquid was removed by cannula and the solid washed two times with 200 mL portions of toluene at 90° C. The solid was again slurried in 160 mL toluene and treated with 40 mL $TiCl_4$ at 90° C. as previously described. The reaction mixture was then heated to 115° C. for 2 h. Upon completion of the reaction, the slurry was cooled to 40° C. and the supernatant liquid removed. The solid was then washed six times with 200 mL portions of heptane at 40° C. The washed solid was then dried in vacuo for 60 minutes at 50° C.

All polymerizations were carried out using the conditions described in Table 1. A 2 liter autoclave was charged with 1.4 liters of liquid propylene and 16 mmol $H_2$. To this was charged 10 mg catalyst, 10 mmol triethyl aluminum ("TEAL") and 0.1 mmol electron donor. The mixture was heated to 70° C. and maintained for 60 minutes. Polymerization was quenched by venting propylene and exposure to air. The polymer was then dried at 60° C. Molecular weight was determined by gel permeation chromatography (GPC).

TABLE 1

Polymerization Data for Laboratory Catalysts

| Ex. | Donor | Yd. (g) | BD (g/cc) | NF (g/10 min) | % XS | $M_n$ | $M_w$ | D | D' | Comments |
|---|---|---|---|---|---|---|---|---|---|---|
| 1 | CMDS | 100 | 0.37 | 4.40 | 2.76 | 49418 | 342298 | 6.93 | 3.49 | 100% DNBP[a] |
| 1' | CPDS | 115 | 0.40 | 1.40 | 2.47 | 60964 | 490554 | 8.05 | 3.51 | 100% DNBP |
| 2 | CMDS | 100 | 0.39 | 11.80 | 6.78 | 36993 | 282859 | 7.65 | 3.89 | 10% DNBP |
| 2' | CPDS | 116 | 0.41 | 7.00 | 6.18 | 39042 | 337369 | 8.64 | 3.96 | 10% DNSP |
| 3 | CMDS | 140 | 0.38 | 9.40 | 5.58 | 39993 | 280935 | 7.02 | 3.69 | 20% DNBP |
| 3' | CMDS | 150 | 0.38 | 5.20 | 4.51 | 40648 | 326827 | 8.04 | 3.80 | 20% DNBP |
| 4 | CMDS | 125 | 0.40 | 12.40 | 6.43 | 29551 | 280654 | 9.50 | 4.09 | 10% DEP |
| 4' | CPDS | 136 | 0.41 | 5.60 | 5.98 | 32957 | 339663 | 10.31 | 4.15 | 10% DEP |
| 5 | CMDS | 58 | 0.38 | 10.50 | 7.06 | 29707 | 273191 | 9.20 | 4.04 | 20% DEP |
| 5' | CPDS | 105 | 0.42 | 5.60 | 5.34 | 31000 | 328987 | 10.61 | 3.97 | 20% DEP |
| 6 | CMDS | 82 | 0.36 | 3.80 | 2.87 | 47997 | 332996 | 6.94 | 3.1 | 100% DEP |
| 6' | CPDS | 98 | 0.36 | 1.70 | 2.44 | 52382 | 386269 | 7.37 | 2.9 | 100% DEP |
| 7 | CMDS | 100 | 0.41 | 10.70 | 7.86 | 26683 | 266472 | 9.99 | 4.03 | 10% DIBP |
| 7' | CPDS | 140 | 0.41 | 7.00 | 6.62 | 30246 | 307558 | 10.17 | 4.11 | 10% DIBP |
| 8 | CMDS | 94 | 0.38 | 3.60 | 1.24 | 48455 | 360514 | 7.44 | 3.46 | 100% DIBP |
| 8' | CPDS | 112 | 0.41 | 1.30 | 2.16 | 63201 | 529919 | 8.38 | 3.50 | 100% DIBP |

Conditions: liquid propylene, 70° C., triethylaluminum cocatalyst, Al/Ti = 200, Al/Si = 10, $H_2$ = 16 mmol
[a]100% is equivalent to 1 mmol phthalate/g $Mg(OEt)_2$ The results above demonstrate that use of DEP or DIBP as an electron donor in the synthesis of a catalyst precursor produces a catalyst which in the polymerization of propylene yields a polymer with a relative broad molecular weight distribution. Furthermore, using a lesser amount of DEP or DIBP electron donor increases the molecular weight distribution to a greater extent than reducing the amount of DNBP electron donor.

As the data above demonstrates, certain external electron donors in combination with the specific catalyst component containing certain internal electron donor produces relatively small amounts of xylene solubles and a relatively broad molecular weight distribution. This effect is especially evident when CPDS is the external electron donor. As shown in the Examples and Table 1 above, xylene solubles are generally significantly lower and the molecular weight distribution is significantly broader for the combination of CPDS as the external electron donor with the catalyst component containing DEP or DIBP as the electron donor. In fact, the Examples for polypropylene having the broadest molecular weight distribution (Examples 4 and 7) are for the combination of CPDS and 10% of either DEP or DIBP. In addition, the use of CPDS as the external electron donor results in increased activity and lower xylene solubles over the combination of the other electron donor with the catalyst component.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims he construed as encompassing all the features of patentable novelty which reside in the present invention, including all features which would be treated and equivalents thereof by those skilled in the art which this invention pertains.

What is claimed is:

1. A process of polymerizing α-olefins comprising:
   a) selecting a Ziegler-Natta catalyst component for the polymerization of propylene wherein the catalyst component comprises:
      1) the halogenated reaction product of magnesium ethoxide and a halogenating agent;
      2) an electron donor wherein the electron donor is diethyl phthalate or di-isobutyl phthalate and wherein the ratio of electron donor to magnesium ethoxide is 0.1 mmole phthalate/g $Mg(OEt)_2$ to 0.2 mmole phthalate/g $Mg(OEt)_2$;
      3) a titanating agent;
   b) contacting the catalyst component with an organoaluminum cocatalyst to form an activated catalyst;
   c) contacting the catalyst component or activated catalyst with dicyclopentyldimethoxysilane as an external electron donor simultaneous with or after contacting the catalyst component with the organoaluminum compound;
   d) introducing the activated catalyst into a polymerization reaction zone containing propylene; and
   e) extracting polymer product from the reactor.

2. The process of claim 1 wherein the halogenating agent is a Group III, Group IV or Group V halide.

3. The process of claim 2 wherein the halogenating agent is titanium tetrachloride.

4. The process of claim 1 wherein in step (a) the mole ratio of magnesium ethoxide to halogenating agent is in the range of about 6:1 to about 1:3.

5. The process of claim 4 wherein the mole ratio of magnesium ethoxide to halogenating agent is in the range of 3:1 to about 1:2.

6. The process of claim 5 wherein the mole ratio of magnesium ethoxide to halogenating agent is in the range of about 2:1 to about 1:2.

7. The process of claim 1 wherein the titanating agent is a tetra-substituted compound with all four substituents being the same and the substituents being a halide or an alkoxide or phenoxide with 2 to 10 carbon atoms.

8. The process of claim 7 wherein the titanating agent is titanium tetrachloride.

9. The process of claim 8 wherein the amount of titanium tetrachloride in step (c) is in the range of about 0.5 to about 5 equivalents based on the magnesium ethoxide.

10. The process of claim 9 wherein the amount of titanium tetrachloride is in the range of about 1 to about 4 equivalents.

11. The process of claim 10 wherein the amount of titanium tetrachloride is in the range of about 1.5 to about 2.5 equivalents.

12. The process of claim 1 wherein the reaction product of a)1) is in a hydrocarbon solvent.

13. The process of claim 12 wherein the hydrocarbon solvent is toluene, heptane, hexane or octane.

14. The catalyst component of claim 13 wherein the hydrocarbon solvent is toluene.

15. The process of claim 1 wherein the cocatalyst is of the general formula $AlR'_3$ where R' is an alkyl of from 1–8 carbon atoms or a halogen and R' may be the same or different with at least one R' being an alkyl.

16. The process of claim 15 wherein the cocatalyst is triethylaluminum.

17. A process of polymerizing α-olefins comprising:
   a) selecting a Ziegler-Natta catalyst component for the polymerization of propylene wherein the catalyst component comprises:
      1) the halogenated reaction product of magnesium ethoxide and a halogenating agent;
      2) an electron donor wherein the electron donor is diethyl phthalate or di-isobutyl phthalate and wherein the ratio of electron donor to magnesium ethoxide is 0.1 mmolephthalate/g $Mg(OEt)_2$ to 0.2 mmole phthalate/g $Mg(OEt)_2$;
      3) a titanating agent;
   b) contacting the catalyst component with an organoaluminum cocatalyst to form an activated catalyst;
   c) contacting the catalyst component or activated catalyst with an external electron donor simultaneous with or after contacting the catalyst component with the organoaluminum compound wherein the external electron donor is dicyclopentyldimethoxysilane or cyclohexylmethyldimethoxysilane;
   d) introducing the activated catalyst into a polymerization reaction zone containing propylene; and
   e) extracting polymer product from the reactor.

18. The process of claim 17 wherein the halogenating agent is a Group 3 Group 4 or Group 5 halide.

19. The process of claim 18 wherein the halogenating agent is titanium tetrachloride.

20. The process of claim 19 wherein the titanating agent is a tetra-substituted titanium compound with all four substituents being the same and the substituents being a halide or an alkoxide or phenoxide with 2 to 10 carbon atoms.

21. The process of claim 20 wherein the titanating agent is titanium tetrachloride.

22. The process of claim 17 wherein the reaction product of (a) is in a hydrocarbon solvent.

23. The process of claim 22 wherein the hydrocarbon solvent is toluene, heptane, hexane or octane.

24. The catalyst component of claim 23 wherein the hydrocarbon solvent is toluene.

25. The process of claim 17 wherein the cocatalyst is of the general formula $AlR'_3$ where R' is an alkyl of from 1–8 carbon atoms or a halogen and R' may be the same or different with at least one R' being an alkyl.

26. The process of claim 25 wherein the cocatalyst is triethylaluminum.

* * * * *